No Printed Specification Available
9789X
L. Knapp.
Roof.
Patented Jun. 28, 1836.
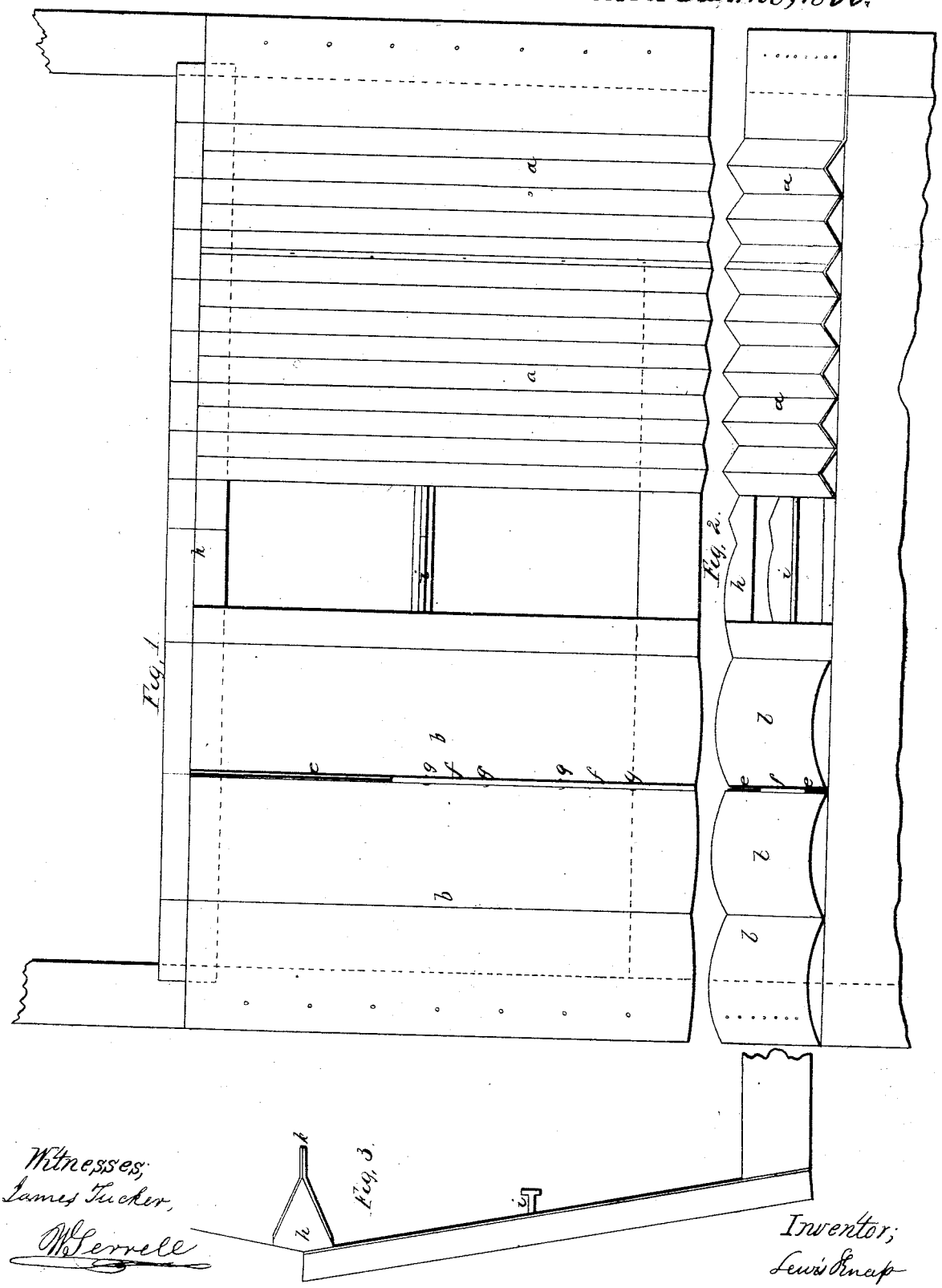
Witnesses;
James Tucker,
W. Serrell
Inventor;
Lewis Knapp
THE GRAPHIC CO. PHOTO-LITH. 39 & 41 PARK PLACE, N.Y.

MISSING PAGE TEMPORARY NOTICE

PATENT # 9789X FOR ISSUE DATE 6-28-1836

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

All text